(12) United States Patent
Noguchi et al.

(10) Patent No.: US 11,702,097 B2
(45) Date of Patent: Jul. 18, 2023

(54) ACCOMMODATION AREA MANAGEMENT DEVICE

(71) Applicant: HONDA MOTOR CO., LTD., Tokyo (JP)

(72) Inventors: Junpei Noguchi, Saitama (JP); Gaku Shimamoto, Saitama (JP); Yuta Takada, Tokyo (JP); Ryoma Taguchi, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 151 days.

(21) Appl. No.: 17/201,461

(22) Filed: Mar. 15, 2021

(65) Prior Publication Data
US 2021/0291857 A1    Sep. 23, 2021

(30) Foreign Application Priority Data
Mar. 19, 2020   (JP) ................................. 2020-050298

(51) Int. Cl.
*B60W 60/00*    (2020.01)
*B60W 40/08*    (2012.01)

(52) U.S. Cl.
CPC .......... *B60W 60/001* (2020.02); *B60W 40/08* (2013.01)

(58) Field of Classification Search
CPC ........ B60W 60/001; A61B 5/01; G01C 21/32; G08G 1/14; G08G 1/144; G08G 1/096758; B60R 1/00; G05D 1/027
See application file for complete search history.

(56) References Cited

U.S. PATENT DOCUMENTS

| | | | | |
|---|---|---|---|---|
| 9,984,572 B1 * | 5/2018 | Newman | ......... | G08G 1/096758 |
| 2003/0088344 A1 * | 5/2003 | Oda | ....... | G05D 1/027 |
| | | | | 318/587 |
| 2018/0120837 A1 * | 5/2018 | Regmi | ..... | B60R 1/00 |

FOREIGN PATENT DOCUMENTS

| | | | | |
|---|---|---|---|---|
| CN | 110189542 A * | 8/2019 | ............ | G08G 1/144 |
| DE | 102017125494 A1 * | 5/2018 | ............... | A61B 5/01 |
| EP | 3276587 A1 * | 1/2018 | ............. | G01C 21/32 |
| JP | 2019-139322 A | 8/2019 | | |
| WO | WO-2019097884 A1 * | 5/2019 | ............... | G08G 1/14 |

* cited by examiner

*Primary Examiner* — Yuri Kan (74) *Attorney, Agent, or Firm* — Paratus Law Group, PLLC (57) ABSTRACT

An accommodation area management device which manages an accommodation area for accommodating a moving body and stops the moving body at a predetermined accommodation position in the accommodation area includes an acquisition unit configured to acquire autonomous movement level information related to autonomous movement that the moving body can perform and a processing unit configured to determine an accommodation position for stopping the moving body based on the autonomous movement level information when the moving body enters the accommodation area.

5 Claims, 6 Drawing Sheets

| VEHICLE ID | AUTONOMOUS DRIVING LEVEL INFORMATION | | | CLASSIFICATION |
|---|---|---|---|---|
| KH106A | HIGH | | ... | A |
| | ROUTE PLAN IMPLEMENTATION FUNCTION: YES | SELF-POSITION RECOGNITION FUNCTION: YES | | |
| KH104A | MEDIUM | | ... | B |
| | ROUTE PLAN IMPLEMENTATION FUNCTION: NO | SELF-POSITION RECOGNITION FUNCTION: YES | | |
| KH109A | LOW | | ... | C |
| | ROUTE PLAN IMPLEMENTATION FUNCTION: NO | SELF-POSITION RECOGNITION FUNCTION: NO | | |
| ⋮ | ⋮ | | ⋮ | ⋮ |

ACCOMMODATION AREA MANAGEMENT DEVICE

CROSS-REFERENCE TO RELATED APPLICATIONS

This application is based upon and claims the benefit of priority from prior Japanese patent application No. 2020-050298, filed on Mar. 19, 2020, the entire contents of which are incorporated herein by reference.

TECHNICAL FIELD

The present invention relates to an accommodation area management device which manages an accommodation area which can accommodate a moving body.

BACKGROUND ART

In recent years, technologies for realizing automatic valet parking including automatic parking in which a vehicle automatically travels from a alighting area to an empty parking area and parks and automatic exiting in which the vehicle exits from the parking area in response to a predetermined call, automatically travels to a predetermined boarding area and stops have been studied. JP-A-2019-139322 discloses a vehicle control device which is easy to be applied to both general parking and automatic valet parking on the premise of a situation where general parking is mixed and which can realize more accurate automatic driving when performing automatic valet parking.

However, in the case of autonomous movement levels which can realize automatic parking and automatic exiting of moving bodies such as vehicles, there are various differences in levels for the moving bodies and such a difference may hinder smooth movement of the moving body within an accommodation area.

SUMMARY OF INVENTION

The invention provides an accommodation area management device capable of effectively utilizing an accommodation area by considering a difference in an autonomous movement level for each moving body.

According to an aspect of the present invention, there is provided an accommodation area management device which manages an accommodation area for accommodating a moving body and stops the moving body at a predetermined accommodation position in the accommodation area. The accommodation area management device includes an acquisition unit configured to acquire autonomous movement level information related to autonomous movement that the moving body can perform and a processing unit configured to determine an accommodation position for stopping the moving body based on the autonomous movement level information when the moving body enters the accommodation area.

According to the invention, the accommodation area can be effectively utilized by considering the difference in the autonomous movement level for each moving body.

DESCRIPTION OF EMBODIMENTS

Hereinafter, an embodiment of an accommodation area management device of the invention will be described with reference to the accompanying drawings. In the following embodiment, an example will be described in which a moving body in the invention is a vehicle such as an automobile and an accommodation area in the invention is a parking lot. Further, in the following embodiment, an example in which the accommodation area management device of the invention is used as a parking lot management device for managing a parking lot will be described.

First, a vehicle of the embodiment will be described. A vehicle (hereinafter, also referred to as vehicle M) of the embodiment is an automobile including a drive source (for example, traveling driving force output device 200 described later) and wheels (for example, two wheels, three wheels, or four wheels) including driving wheels driven by the power of the drive source. As the drive source of the vehicle M, for example, an electric motor, an internal combustion engine (for example, a gasoline engine), or a combination of the electric motor and the internal combustion engine is used.

Figure 1:
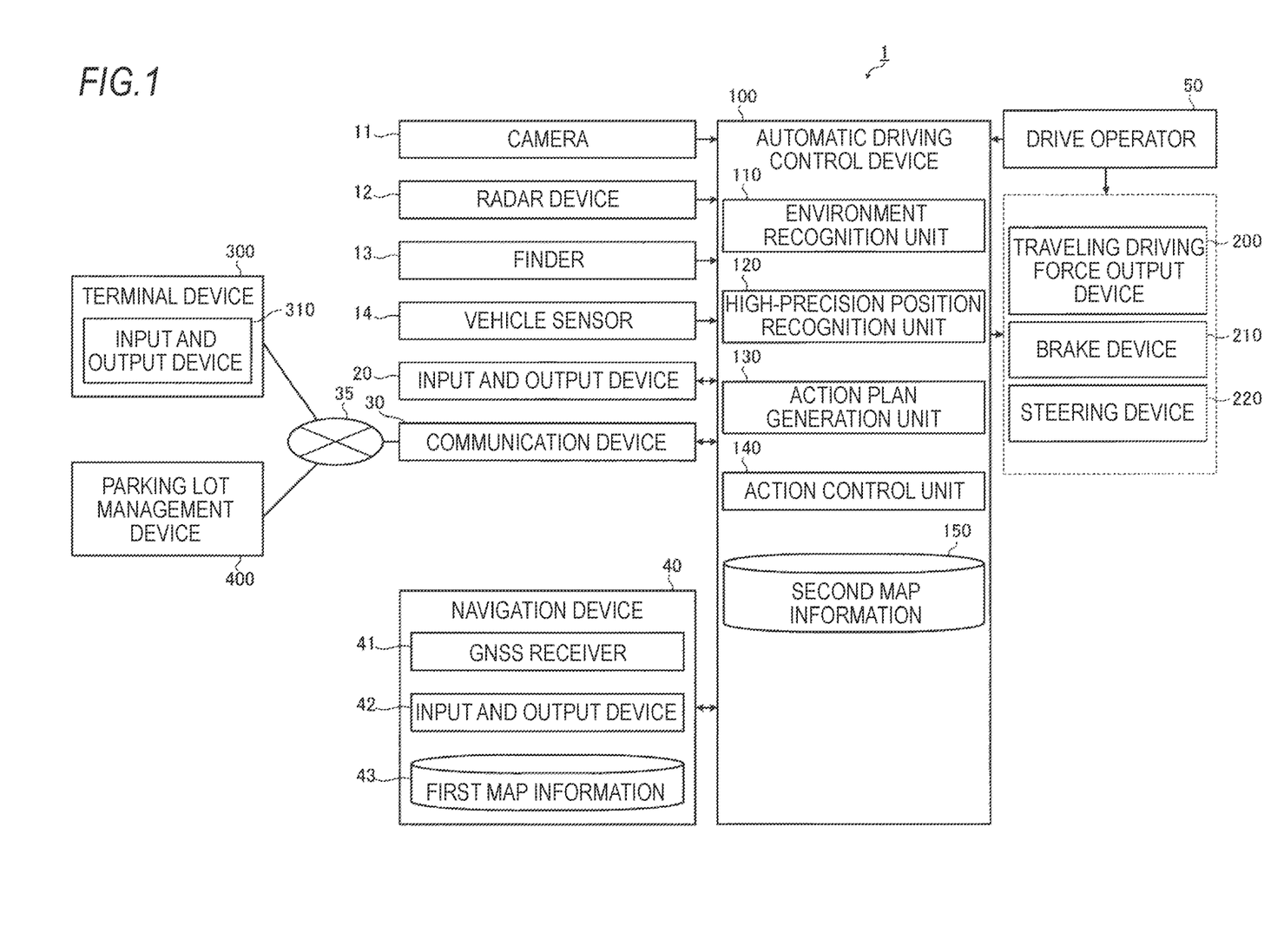
FIG. 1 is a diagram illustrating an example of a configuration of a vehicle system according to an embodiment.

Further, the vehicle M includes a vehicle system 1 illustrated in FIG. 1. The vehicle system 1 has a function capable of performing all driving tasks related to the vehicle M, at least within a limited specific area (for example, in parking lot PA described below). Here, the driving task is, for example, a real-time driving function necessary for maneuvering the vehicle M such as controlling a left-right movement (steering) of the vehicle M, controlling a forward-backward movement (acceleration, deceleration), and monitoring the driving environment, and a tactical function such as planning a traveling track.

As illustrated in FIG. 1, the vehicle system 1 includes a camera 11, a radar device 12, a finder 13, a vehicle sensor 14, an input and output device 20, a communication device 30, a navigation device 40, a drive operator 50, an automatic driving control device 100, the traveling driving force output device 200, a brake device 210, a steering device 220. Each of those devices is communicably connected to each other by a wired or wireless communication network. The communication network connecting each of those devices is, for example, Controller Area Network (CAN).

The camera 11 is a digital camera which photographs the periphery (for example, in front of vehicle M) of the vehicle M and outputs image data obtained by the photographing to the automatic driving control device 100. The radar device 12 is, for example, a radar device using radio waves in a millimeter wave band, detects a position of an object in the vicinity (for example, in front of, behind, and to the side of vehicle M) of the vehicle M. and outputs the detection result to the automatic driving control device 100.

The finder 13 is, for example, Laser Imaging Detection and Ranging (LIDAR). The finder 13 uses a predetermined laser beam to measure the distance to an object (target object) around (for example, in front of, behind, and to the side of vehicle M) the vehicle M and outputs the measurement result to the automatic driving control device 100.

The vehicle sensor 14 includes, for example, a vehicle speed sensor which detects the speed of the vehicle M, an acceleration sensor which detects the acceleration of the vehicle M, an angular velocity sensor which detects the angular velocity around a vertical axis of the vehicle M, an orientation sensor which detects the orientation of the vehicle M. and the like. Further, the vehicle sensor 14 includes a radio wave intensity sensor which detects the radio wave intensity (that is, the communication intensity) of the radio wave used by the communication device 30 for communication. The vehicle sensor 14 outputs the detection result of each sensor to the automatic driving control device 100 or the like.

The input and output device 20 includes an output device which outputs various information to a user of the vehicle M (hereinafter, also simply referred to as a user) and an input device which accepts various input operations from a user. In the embodiment, a user is not limited to the person who manages or owns the vehicle M and uses the vehicle M. For example, a user may be a person who uses the vehicle M on his or her behalf at the request of a person who manages or owns the vehicle M.

The output device of the input and output device 20 is, for example, a display which displays based on a processing result of the automatic driving control device 100. The output device may be a speaker, a buzzer, an indicator light, or the like. Further, the input device of the input and output device 20 is, for example, a touch panel or an operation button (key, switch, or the like) which outputs an operation signal corresponding to an input operation received from a user to the automatic driving control device 100.

The communication device 30 is wirelessly connected to a network 35 and communicates with another device provided outside the vehicle system 1 via the network 35. The network 35 includes, for example, a mobile communication network, a Wi-Fi network, Bluetooth (registered trademark), Dedicated Short Range Communication (DSRC), and the like.

The communication device 30 communicates with, for example, a terminal device 300 carried by a user and a parking lot management device 400 which manages the parking lot PA where the vehicle M can be parked. The terminal device 300 is, for example, a smartphone or a tablet terminal and is an electronic device connected to the network 35 and including an input and output device 310. The input and output device 310 is, for example, a display which displays various information to a user, a touch panel which accepts a user's input operation, and the like. The parking lot PA and the parking lot management device 400 will be described below.

The navigation device 40 includes a Global Navigation Satellite System (GNSS) receiver 41 and an input and output device 42. Further, the navigation device 40 includes a storage device (not illustrated) such as a hard disk drive (hereinafter, also referred to as HDD) and a flash memory and first map information 43 is stored in this storage device. The first map information 43 is, for example, information representing a road shape by a link indicating a road and a node connected by the link. Further, the first map information 43 may include information representing the curvature of the road and the Point Of Interest (POI).

The GNSS receiver 41 identifies the latitude and longitude of a point where the vehicle M is located as the position of the vehicle M based on the signal received from the GNSS satellite. Further, the navigation device 40 may specify or correct the position of the vehicle M by an Inertial Navigation System (INS) using the output of the vehicle sensor 14.

The input and output device 42 includes an output device which outputs various kinds of information to a user and an input device which accepts various input operations from a user. The output device of the input and output device 42 is, for example, a display which displays (for example, displays a route on a map described below) based on the processing result of the navigation device 40. Further, the input device of the input and output device 42 is, for example, a touch panel or an operation button (key, switch, or the like) which outputs an operation signal corresponding to the input operation received from a user to the navigation device 40. The input and output device 42 may be shared with the input and output device 20.

Although detailed description is omitted, the navigation device 40 determines, for example, a route (hereafter, also referred to as the route on the map) from the position of the vehicle M specified by the GNSS receiver 41 to a destination input by a user with reference to the first map information 43. Then, the navigation device 40 guides a user on the determined route on the map by the input and output device 42. Further, the navigation device 40 is configured to be able to output information indicating the position of the specified vehicle M and information indicating the determined route on the map to the automatic driving control device 100.

Some or all the functions of the navigation device 40 may be realized by the terminal device 300. Further, some or all the functions of the navigation device 40 may be realized by an external server device (a navigation server) capable of communicating with the vehicle system 1 by the communication device 30 or the like.

The drive operator 50 is various operators such as an accelerator pedal, a brake pedal, a shift lever, a steering wheel, a deformed steering wheel, and a joystick. The drive operator 50 is provided with a sensor which detects the amount of operation or the presence or absence of operation on the drive operator 50. The detection result by the sensor of the drive operator 50 is output to a part or all of the automatic driving control device 100, the traveling driving force output device 200, the brake device 210, and the steering device 220.

The traveling driving force output device 200 outputs a traveling driving force (torque) for the vehicle M to travel to the driving wheels. The traveling driving force output device 200 includes, for example, an electric motor and an electric motor Electronic Control Unit (ECU) which controls the electric motor. The electric motor ECU controls the electric motor based on the detection result by the sensor of the drive operator 50 (for example, the accelerator pedal) and the control information from the automatic driving control device 100. Further, when the vehicle M includes an internal combustion engine or a transmission as a drive source, the traveling driving force output device 200 may include an internal combustion engine or a transmission and an ECU for controlling the internal combustion engine or the transmission.

The brake device 210 includes, for example, a brake caliper, a cylinder which transmits hydraulic pressure to the brake caliper, an electric motor which generates hydraulic pressure in the cylinder, and a brake ECU. Based on the detection result by the sensor of the drive operator 50 (for example, the brake pedal) and the control information from the automatic driving control device 100, the brake ECU controls the electric motor of the brake device 210 so that the brake torque corresponding to the braking operation is output to each wheel.

The steering device 220 includes, for example, a steering ECU and an electric motor. The electric motor of the steering device 220, for example, applies a force to the rack and pinion mechanism to change the direction of the steering wheel. Based on the detection result by the sensor of the drive operator 50 (for example, the steering wheel) and the control information from the automatic driving control device 100, the steering ECU drives the electric motor of the steering device 220 to change the direction (that is, the steering angle) of the steering wheels.

The automatic driving control device 100 includes an environment recognition unit 110, a high-precision position recognition unit 120, an action plan generation unit 130, and an action control unit 140. Further, the automatic driving control device 100 includes a storage device (not illustrated) realized by a flash memory or the like to which each functional unit (for example, high-precision position recognition unit 120) of the automatic driving control device 100 can access and second map information 150 is stored in this storage device.

The second map information 150 is more accurate map information than the first map information 43. The second map information 150 includes, for example, information indicating the center of a lane, information indicating a lane boundary line (for example, a road lane marking), and the like. Further, the second map information 150 may include road information, traffic regulation information, address information, facility information, telephone number information, and the like.

Further, the second map information 150 may be updated at any time by the communication device 30 communicating with another device. For example, when the vehicle M enters the parking lot PA, the communication device 30 receives information (hereafter, also referred to as in-parking-lot map information) indicating the lane in the parking lot PA, the position of each parking space, and the like from the parking lot management device 400. Then, the automatic driving control device 100 updates the second map information 150 so as to incorporate the received in-parking-lot map information into the second map information 150. As a result, the automatic driving control device 100 can specify the position of each parking space in the parking lot PA with reference to the second map information 150.

The environment recognition unit 110 performs sensor fusion processing on information acquired by a part or all of the camera 11, the radar device 12, and the finder 13, in such a manner that the environment recognition unit 110 recognizes an object around the vehicle M and recognizes its position. The environment recognition unit 110 recognizes, for example, an obstacle, a road shape, a traffic light, a guardrail, a utility pole, a surrounding vehicle (including traveling conditions such as speed and acceleration and parking conditions), a lane mark, a pedestrian, and the like and recognizes their positions.

Referring to the position of the vehicle M specified by the navigation device 40, the detection result by the vehicle sensor 14, the image taken by the camera 11, the second map information, and the like, the high-precision position recognition unit 120 recognizes the detailed position and attitude of the vehicle M. The high-precision position recognition unit 120 recognizes, for example, the traveling lane in which the vehicle M is traveling or recognizes the relative position and attitude of the own vehicle with respect to the traveling lane. Further, the high-precision position recognition unit 120 also recognizes, for example, the position of the vehicle M in the parking lot PA.

The action plan generation unit 130 generates an action plan for the vehicle M. Specifically, the action plan generation unit 130 generates a target track on which the vehicle M will travel in the future as an action plan of the vehicle M. The target track is, for example, information in which points (track points) to be reached by the vehicle M are arranged for each predetermined traveling distance (for example, about several [m]). Further, the target track may include information on speed elements such as the target speed and the target acceleration of the vehicle M at each predetermined time or at each track point. The action plan generation unit 130 generates an action plan according to the instructions of the parking lot management device 400 received by the communication device 30, for example.

The action control unit 140 controls the vehicle M to act according to the action plan generated by the action plan generation unit 130. Specifically, the action control unit 140 controls the traveling driving force output device 200, the brake device 210, and the steering device 220 so that the vehicle M passes the target track generated by the action plan generation unit 130 at the scheduled time. The action control unit 140 controls, for example, the traveling driving force output device 200 and the brake device 210 based on the speed element associated with the target track and controls the steering device 220 according to a curvature degree of the target track.

Each functional unit included in the automatic driving control device 100 is realized, for example, by the Central Processing Unit (CPU) executing a predetermined program (software). Further, a part or all of the functional units of the automatic driving control device 100 may be realized by hardware such as Large Scale Integration (LSI), Application Specific Integrated Circuit (ASIC), Field-Programmable Gate Array (FPGA), Graphics Processing Unit (GPU), and for example, the storage device for storing the second map information 150 and the high-precision position recognition unit 120 may be realized by a Map Positioning Unit (MPU). Further, a part or all of the functional units of the automatic driving control device 100 may be realized by the cooperation of software and hardware.

Figure 2:
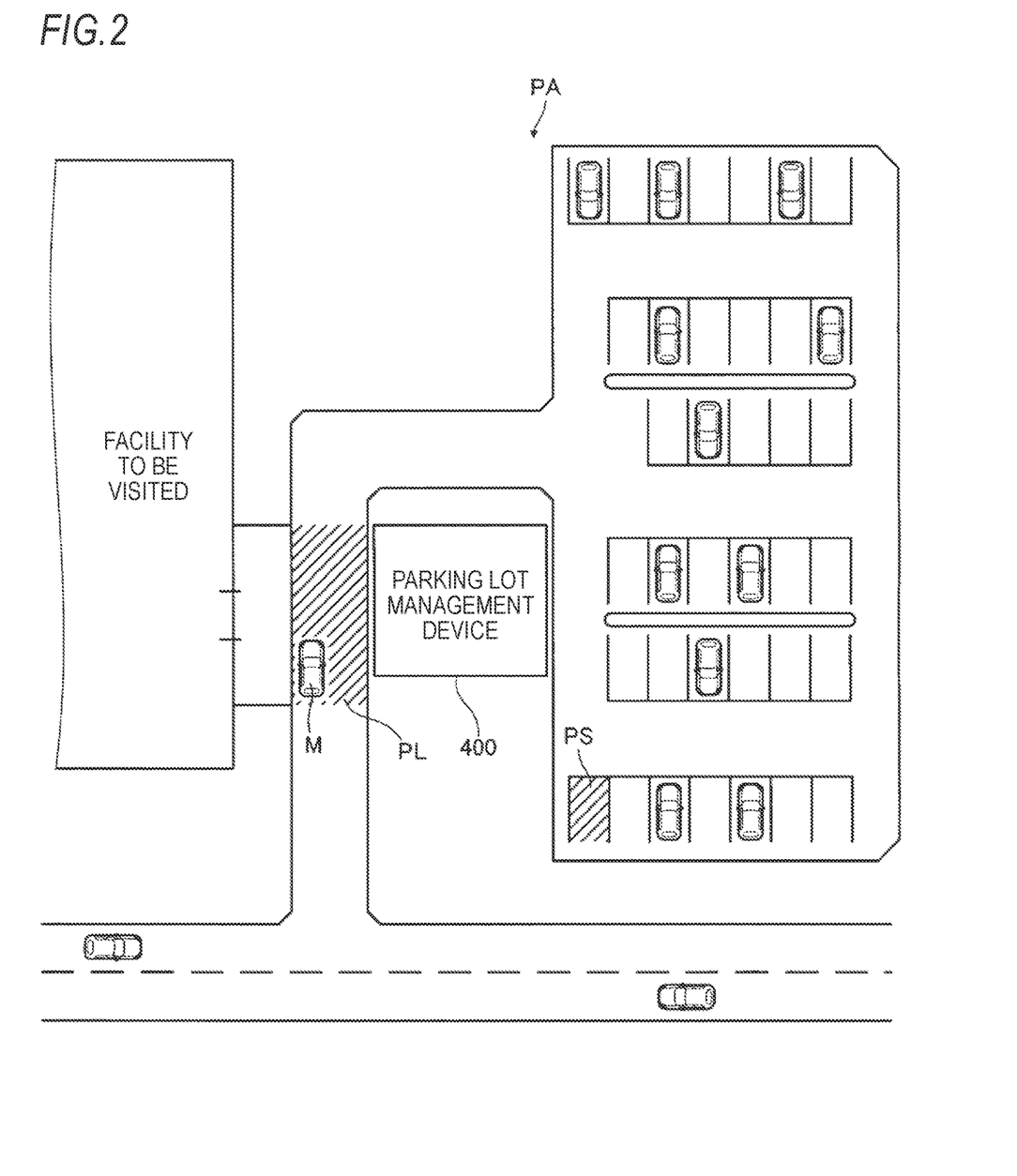
FIG. 2 is a diagram illustrating an example of a parking lot managed by a parking lot management device.

Next, an example of the parking lot PA in which the vehicle M can be parked will be described with reference to FIG. 2. As illustrated in FIG. 2, the parking lot PA is an automatic valet parking type parking lot attached to a visited facility to be visited by a user and is managed by the parking lot management device 400. The parking lot PA includes a plurality of parking spaces PS where a vehicle (for example, vehicle M) can be accommodated and a platform PL provided right before the plurality of parking spaces PS. Hereinafter, an example in which a user uses the parking lot PA, that is, the vehicle M is admitted to the parking lot PA will be described.

Prior to using the parking lot PA, a user makes a reservation (hereinafter, also referred to as a parking reservation) for using the parking lot PA using the navigation device 40, the terminal device 300, or the like. This "user" is not limited to the owner and manager of the vehicle M, but includes, for example, a person (for example, a concierge) who performs procedures such as parking reservation on behalf of the owner of the vehicle M. In this parking reservation, the user inputs a vehicle ID, which is an identifier (identification information) of the vehicle M, a scheduled parking time for parking the vehicle M in the parking lot PA, and the like. As the scheduled parking time, for example, the scheduled entry date and time when the vehicle M is scheduled to enter the parking lot PA and the scheduled exit date and time when the vehicle M is scheduled to exit from the parking lot PA are input. The information entered by the user is sent to the parking lot management device 400. With reference to the received information and the management table (not illustrated) showing the parking reservation status of the parking lot PA, the parking lot management device 400 determines whether there is a parking space PS where the vehicle M can be parked during the scheduled parking time (the period from the scheduled entry date and time to the scheduled exit date and time). Then, when there is a parking space PS in which the vehicle M can be parked, the parking lot management device 400 accepts the parking reservation and notifies the user to that effect.

After that, when the scheduled parking time comes, the user rides the vehicle M on the platform PL and gets off from the vehicle M at the platform PL. After the user gets off the vehicle M, the vehicle M automatically drives and executes a self-propelled entry event to move to a predetermined parking space PS in the parking lot PA. For example, when the user gets off the vehicle M at the platform PL, the user sends a request for starting the self-propelled entry event to the parking lot management device 400 by the terminal device 300 or the like. When the parking lot management device 400 receives the start request of the self-propelled entry event, the parking lot management device 400 determines the parking space PS to which the vehicle M should be stored with reference to a parking space information table 442 described below and instructs the vehicle M to move to the parking space PS. Further, the parking lot management device 400 may also determine a route on which the vehicle M should travel to the parking space PS where the vehicle M should be stored, and instruct the vehicle M to move along the route. Then, the vehicle M moves to the parking space PS instructed by the parking lot management device 400 while performing sensing by the camera 11, the radar device 12, the finder 13, or the like according to the instruction received from the parking lot management device 400.

When exiting from the parking lot PA, the user causes the vehicle M to execute a self-propelled exit event. When the vehicle M executes a self-propelled exit event, it automatically drives from the parked parking space PS and moves to the platform PL. For example, when the vehicle M is made to execute the self-propelled exit event, the user sends a start request of the self-propelled exit event to the parking lot management device 400 by his or her terminal device 300 or the like. Upon receiving the start request of this self-propelled exit event, the parking lot management device 400 instructs the vehicle M to move to the platform PL. In this case, the parking lot management device 400 may also determine the route on which the vehicle M should travel to the platform PL and instruct the vehicle M to move along the route. The vehicle M which has received the instruction from the parking lot management device 400 moves to the platform PL while sensing with the camera 11, the radar device 12, the finder 13, or the like. Then, the user gets on the vehicle M at the platform PL and exits from the parking lot PA.

Figure 3:
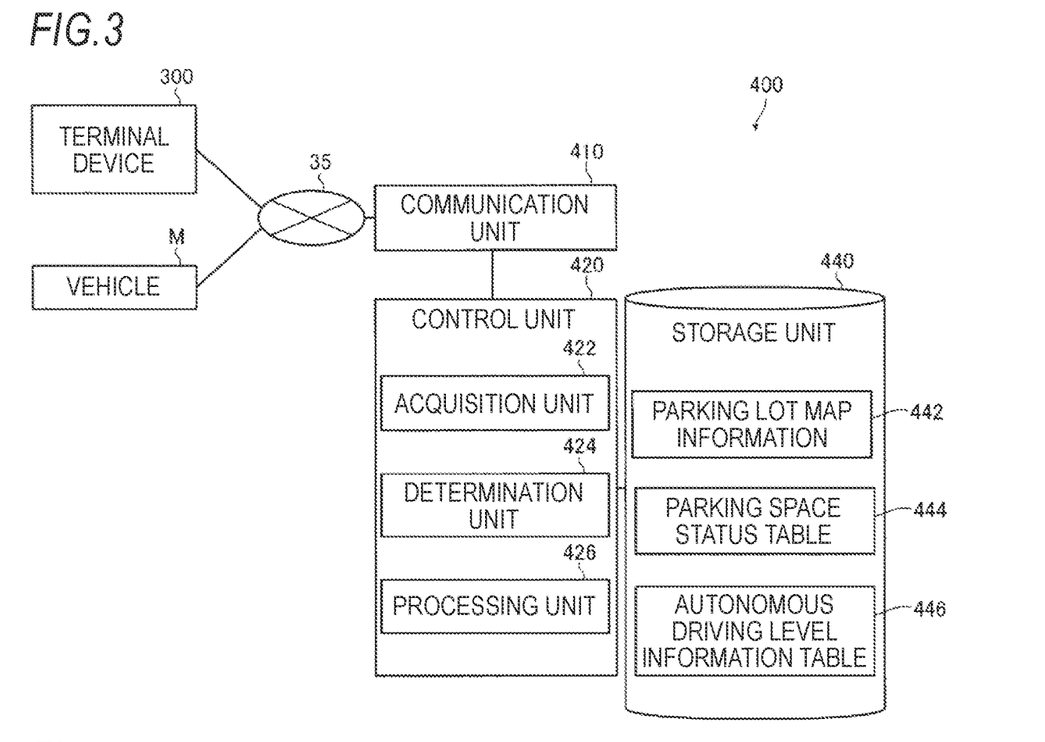
FIG. 3 is a diagram illustrating an example of a configuration of the parking lot management device.

Next, an example of the configuration of the parking lot management device 400 will be described with reference to FIG. 3. As illustrated in FIG. 3, the parking lot management device 400 includes, for example, a communication unit 410, a control unit 420, and a storage unit 440. The control unit 420 includes, for example, an acquisition unit 422, a determination unit 424, and a processing unit 426. Each component of the control unit 420 is realized, for example, by a hardware processor such as a CPU executing a program (software). Some or all of those components may be realized by hardware (circuit part, including circuitry) such as LSI, ASIC, FPGA, and GPU, or may be realized by collaboration between software and hardware. The program may be stored in advance in a storage device (a storage device including a non-transient storage medium) such as an HDD or a flash memory, or the program may be stored in a removable storage medium (a non-transient storage medium) such as a DVD or a CD-ROM and installed by attaching the storage medium to a drive device.

Information such as parking lot map information 442, a parking space status table 444, and an autonomous driving level information table 446 is stored in the storage unit 440. The parking lot map information 442 is information which geometrically represents the structure of the parking lot PA. Further, the parking lot map information 442 includes coordinates for each parking space PS. The parking space status table 444 and the autonomous driving level information table 446 will be described below. The storage unit 440 is realized by an HDD, a flash memory, or the like.

The communication unit 410 wirelessly (for example, network 35) communicates with the vehicle M and the users terminal device 300. The control unit 420 determines the parking space PS for parking the vehicle M based on the information acquired by the communication unit 410 and the information stored in the storage unit 440.

The control unit 420 includes, for example, the acquisition unit 422 and the determination unit 424. The acquisition unit 422 acquires the position information of the vehicle M parked in the parking lot PA, for example, via the communication unit 410. This position information is stored, for example, in the format of the parking space status table 444 illustrated in FIG. 4.

Figure 4:
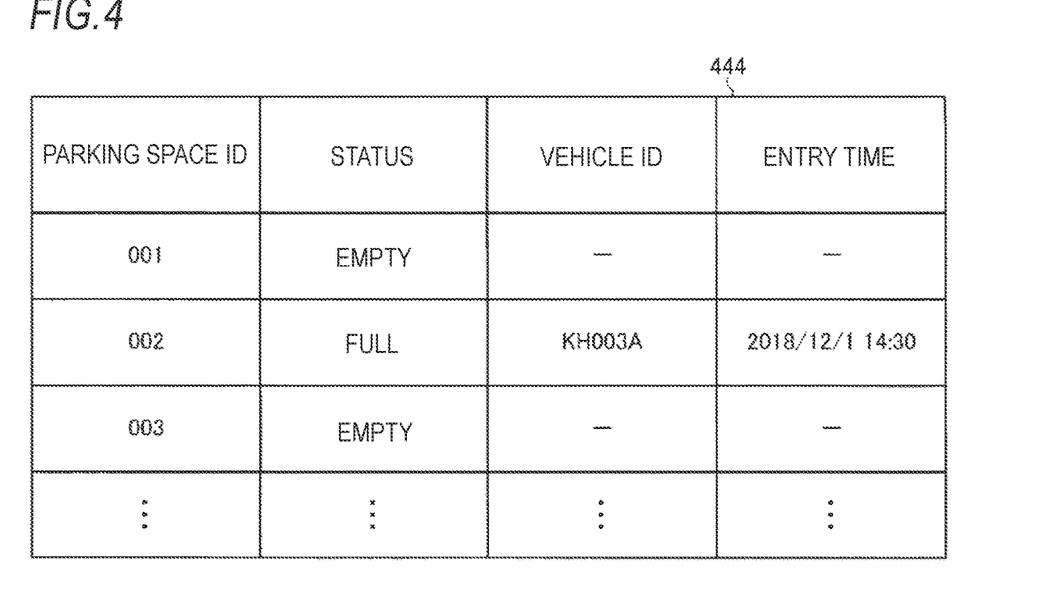
FIG. 4 is a diagram illustrating an example of a parking space status table.

As illustrated in FIG. 4, the parking space status table 444 is a table in which, for example, information indicating whether the parking space is empty or full (parked), the vehicle ID which is the identification information of the parked vehicle M when the parking space is full, and the entry time of the vehicle M when the parking space is full are associated with the parking space ID which is the identification information of the parking space PS. The entry time is recorded in association with the vehicle ID of the vehicle M when the vehicle M enters the parking lot. The vehicle ID can be, for example, a vehicle number or a chassis number written on a vehicle number plate (so-called license plate).

Also, the acquisition unit 422 acquires, for example, autonomous driving level information regarding the autonomous driving level (the autonomous movement level) of the vehicle M to be stored in the parking lot PA or the vehicle M parked in the parking lot PA via the communication unit 410. The autonomous driving level indicates a level at which the vehicle M can move (travel) autonomously. For example, the more items (movements) that the vehicle M can autonomously perform, the higher the level is given.

More specifically, for example, the vehicle M which can implement a route plan to a parking position instructed from the parking lot management device 400, can move along the planned route while recognizing the position of the own vehicle, and can be parked at the parking position instructed by the parking lot management device 400 without guidance or support from other devices (for example, parking lot management device 400) is assumed to have a high autonomous driving level. In addition, the vehicle M which can move according to the route plan implemented by the parking lot management device 400 while recognizing the position of the own vehicle and can be parked at the parking position instructed by the parking lot management device 400 is assumed to have a medium autonomous driving level. Further, the vehicle M which moves according to the route plan implemented by the parking lot management device 400 while referring to the position of the own vehicle notified from the parking lot management device 400 and can be parked at the parking position instructed by the parking lot management device 400 is assumed to have a low autonomous driving level.

The function of executing the route plan to the parking position instructed from the parking lot management device 400, that is, the function of searching and determining the route to the parking position instructed by the parking lot management device 400, is also hereinafter referred to as the route plan implementation function. In addition, the function of recognizing the position of the own vehicle in the parking lot PA is also hereinafter referred to as the self-position recognition function.

For example, the vehicle M to be stored in the parking lot PA and the vehicle M parked in the parking lot PA transmit the autonomous driving level information indicating the autonomous driving level of the own vehicle to the parking lot management device 400 in association with the vehicle ID of the own vehicle. For example, the vehicle M having the route plan implementation function and the self-position recognition function transmits information indicating "high" as the autonomous driving level information indicating the autonomous driving level of the own vehicle. Further, the vehicle M which does not have the route plan implementation function but has the self-position recognition function transmits information indicating "medium" as the autonomous driving level information indicating the autonomous driving level of the own vehicle. Then, the vehicle M which does not have the route plan implementation function and the self-position recognition function transmits information indicating "low" as the autonomous driving level information indicating the autonomous driving level of the own vehicle.

Further, the vehicle M may transmit information indicating the function of the own vehicle among the functions related to the autonomous driving as the autonomous driving level information. For example, the vehicle M which has the route plan implementation function and the self-position recognition function may transmit information indicating the route plan implementation function "Yes" and the self-position recognition function "Yes" as the autonomous driving level information indicating the autonomous driving level of the own vehicle. In addition, the vehicle M which does not have the route plan implementation function but has a self-position recognition function may transmit information indicating the route plan implementation function "No" and the self-position recognition function "Yes" as the autonomous driving level information indicating the autonomous driving level of the own vehicle. Also, the vehicle M which does not have the route plan implementation function and the self-position recognition function may transmit information indicating the route plan implementation function "No" and the self-position recognition function "No" as the autonomous driving level information indicating the autonomous driving level of the own vehicle.

Figure 5:
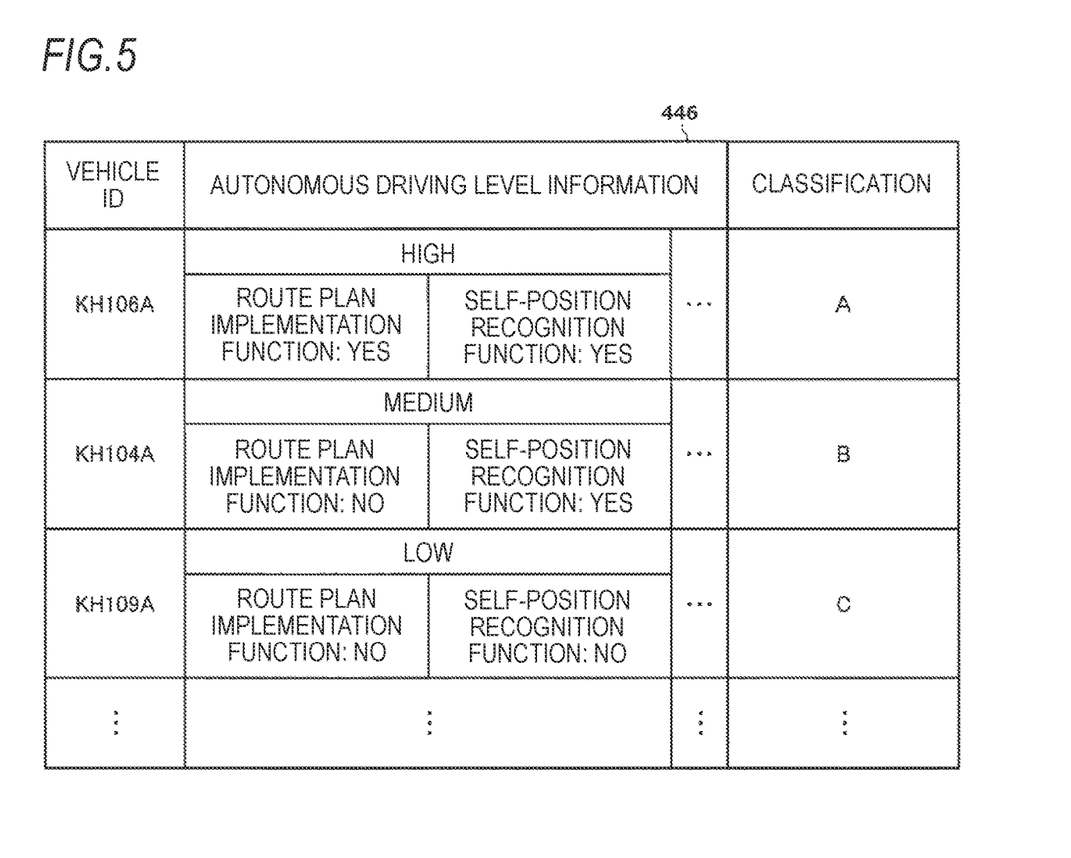
FIG. 5 is a diagram illustrating an example of an autonomous driving level information table.

The acquisition unit 422 acquires the autonomous driving level information transmitted from the vehicle M to enter the parking lot PA and the vehicle M parked in the parking lot PA, and then the acquisition unit 422 stores the acquired autonomous driving level information in the autonomous driving level information table 446 illustrated in FIG. 5 in association with the vehicle ID of the vehicle M.

The determination unit 424 classifies the vehicle M to enter the parking lot PA and the vehicle M parked in the parking lot PA based on the autonomous driving level information of each vehicle, and then the determination unit 424 stores, for example, information indicating the classification in the autonomous driving level information table 446 in association with the vehicle ID of each vehicle. Here, there are at least two classifications, and in the embodiment, three classifications of classification A, classification B, and classification C, are provided. For example, the determination unit 424 classifies the vehicle M having the autonomous driving level information "high" into the classification A, the vehicle M having the autonomous driving level information "medium" into the classification B, and the vehicle M having the autonomous driving level information "low" into the classification C. That is, the classifications A. B, and C are classified in descending order of the autonomous driving level.

Further, the determination unit 424 may classify the vehicle M to enter the parking lot PA or the vehicle M parked in the parking lot PA based on the function related to autonomous driving provided by each vehicle. For example, in this case, the determination unit 424 may classify the vehicle M having the route plan implementation function and the self-position recognition function into the classification A, the vehicle M which does not have the route plan implementation function but has the self-position recognition function into the classification B, and the vehicle M which does not have the route plan implementation function and the self-position recognition function into the classification C. The number of classifications and the classification method are not limited to those listed here.

First Control Example

Next, a first control example of the parking lot management device 400 will be described. As described above, the autonomous driving level of each vehicle in the parking lot PA varies and the difference thereof may hinder the smooth movement and parking of the vehicle M in the parking lot PA. For example, it is expected that the vehicle M (that is, vehicle M having a high autonomous driving level) of the classification A can move in the parking lot PA more quickly than the vehicle M (that is, vehicle M having a low autonomous driving level) of the classification C. Therefore, the vehicles M with the same classification, that is, the vehicles M with similar autonomous driving levels, are grouped together and parked in a specific area in the parking lot PA, in such a manner that it is expected that the movement (for example, the movement until parking) of those vehicles M can be performed more smoothly.

Therefore, the parking lot management device 400 determines the parking position for parking the vehicle M based on the autonomous driving level information acquired from the vehicle M when the vehicle M enters the parking lot PA. In particular, the parking lot management device 400 determines the parking position for parking the vehicle M by the processing unit 426 based on the autonomous driving level information obtained by the acquisition unit 422 when the vehicle M is parked in the parking lot PA. This allows the parking lot management device 400 to park each vehicle in an appropriate parking position considering its autonomous driving level. Therefore, compared with the case where the autonomous driving level of each vehicle is not considered at all, the utilization efficiency of the entire parking lot PA can be improved, and thus the parking lot PA can be effectively utilized.

For example, under the condition that there are at least two classifications based on autonomous driving level information such as the above-described classifications A. B. and C, it is desirable that the processing unit 426 determines the parking position of the vehicle M so that the vehicles M of the same classification are collectively parked in a specific partial parking area in the parking lot PA. The partial parking area is an area which occupies a specific part in the parking lot PA and includes at least one parking space PS (the parking position). As a result, the parking position is determined while the vehicles M, which can be classified as having similar (for example, the same) performance related to autonomous driving, are put together. Therefore, it is possible to suppress the possibility that vehicles M, which have a large performance difference related to autonomous driving, are parked next to each other, and to further improve the utilization efficiency of the entire parking lot PA.

Further, it is desirable that the processing unit 426 changes the distribution of the partial parking area based on the usage status of the parking lot PA. As a result, the position where the vehicles M having the same classification are grouped and parked becomes variable based on the usage status of the parking lot PA, and thus the parking position can be determined according to the usage status. In addition, here, the usage status of the parking lot PA may include, in addition to the current parking lot PA status (for example, the number of vehicles parked in parking lot PA and the dimension of the parking area occupied by those vehicles) and the future parking lot PA status (parking reservation information), a prediction result based on the information on the status of the parking lot PA accumulated in the past. In this way, it is possible to deal with vehicles which suddenly come to the parking lot PA where parking reservations are made immediately before entering.

For example, suppose that the number of parked vehicles M with a high autonomous driving level is large on weekdays and the number of parked vehicles M with a low autonomous driving level is large on holidays. In this case, the distribution of the partial parking area may be varied such that the vehicle M with a low autonomous driving level is parked on the entrance side of the parking lot PA on weekdays and the vehicle M with a high autonomous driving level is parked on the entrance side of the parking lot PA on holidays. By doing so, the utilization efficiency of the entire parking lot PA can be improved, and thus the parking lot PA can be effectively utilized. The distribution of the partial parking area can be changed at any time.

In addition, the autonomous driving level of the vehicle M may change when the vehicle is parked in the parking lot PA after entering the parking lot PA. For example, the software related to the automatic driving control device 100 of the vehicle M may be automatically updated over wireless (for example, network 35) by an instruction from the parking lot management device 400 or the like. In such a case, the autonomous driving level of the vehicle M may change and the classification of the vehicle M may change.

When the autonomous driving level and classification of the vehicle M change in this way, it is desirable for the processing unit 426 to determine the parking position included in the partial parking area, among a partial parking area corresponding to the autonomous driving level and classification before the change and a partial parking area corresponding to the autonomous driving level and classification after the change, where the number of parked vehicles M is small as the parking position where the vehicle M whose autonomous driving level and classification have changed is parked. In this way, the vehicle M whose autonomous driving level and classification have changed is parked in the partial parking area where the number of parked vehicle M is smaller, in such a manner that it is possible to improve the convenience in the parking lot PA by averaging the number of parked vehicles in each partial parking area.

In addition, by changing the autonomous driving level and classification of the vehicle M, the number of vehicles M which can be accepted in the parking lot PA may increase. For example, suppose that the vehicle M with a low autonomous driving level (for example, classification C) tries to park in the situation where the partial parking area corresponding to the low autonomous driving level classification (for example, classification C) is full, but the partial parking area corresponding to the higher autonomous driving level classification (for example, classification B) has an empty space. In this state, the partial parking area corresponding to the low autonomous driving level classification is full and the vehicle M cannot be parked. However, when the software related to the automatic driving control device 100 can be updated (so-called update) to raise (for example, from classification C to classification B) the classification of the autonomous driving level of the vehicle M, the vehicle M can be parked, and thus the parking lot PA can be effectively used.

Therefore, in such a situation, the processing unit 426 inquiries to the terminal device 300 of a user of the vehicle M via the communication unit 410 whether to change the autonomous driving level of the vehicle M, and then it is desirable that the processing unit 426 changes the autonomous driving level with the permission of the user. As a result, it is possible to improve the utilization efficiency of the entire parking lot PA and effectively utilize the parking lot PA while respecting the intention of the user. Respecting the users intention here means, for example, entrusting the determination of whether to allow an occurrence of a vehicle unusable time where the vehicle M cannot be used due to the change that raises the autonomous driving level and the reduction of the energy source due to this change at the user's intention.

It is also conceivable that the vehicle M cannot enter the parking lot PA at the same autonomous driving level. Here, when it is necessary to change the autonomous driving level of the vehicle M before it enters the parking lot PA, it is desirable that the processing unit 426 notifies a user of the vehicle M that the autonomous driving level needs to be changed before entering the parking lot PA. As a result, for example, when the software related to the automatic driving control device 100 can be updated prior to entering the parking lot PA, by notifying the user that the update is a condition for the vehicle M to enter the parking lot PA, it is possible to increase the number of parking available spaces in the parking lot PA while respecting the user's intention. As a result, the parking lot PA can be used effectively. The autonomous driving level may be changed, that is, the update itself may be performed after the vehicle enters the parking lot PA.

Also, when it is necessary to change the autonomous driving level of the vehicle M after entering the parking lot PA, the processing unit 426 may be set so that the change in its autonomous driving level is a time-limited change (for example, a temporary change). This makes it possible to increase the number of parking available spaces in the parking lot PA while suppressing the cost of changing the autonomous driving level, that is, updating the software. The software update cost may be borne by an administrator (that is, an operator of parking lot PA) of the parking lot management device 400. Further, when the user desires a non-temporary permanent update, the update cost may be borne by the user. In addition, even when it is a permanent update, if the update is performed at the request of the parking lot PA side, it is possible to discount a part from the cost borne by the user.

As described above, the parking lot management device 400 can determine the parking position of the vehicle M according to its autonomous driving level from the viewpoint of effective utilization of the parking lot PA. As a result, the parking lot PA can be operated efficiently.

Further, when the processing unit 426 determines the parking position of the vehicle M, it determines a suitable route to the determined parking position by referring to, for example, the parking lot map information 442, and then the processing unit 426 transmits the determined route to the vehicle M via the communication unit 410. In the vehicle M which has received the route, the action plan generation unit 130 generates a target track based on the received route and the action control unit 140 controls the vehicle M to act according to the action plan generated by the action plan generation unit 130. As a result, the vehicle M is guided to the parking space PS, which is the parking position determined by the parking lot management device 400, and is parked in the parking space PS.

In addition, when the parking position of the vehicle M parked in the parking lot PA is changed due to factors such as a change in the autonomous driving level, the processing unit 426 may determine the parking position again based on the autonomous driving level after the change, determine a suitable route to the parking position, and transmit the determined route to the vehicle M via the communication unit 410. Further, when the autonomous driving level of the vehicle M is high, as described above, the processing unit 426 may transmit only the determined parking position.

Processing Flow of First Control Example

Figure 6:
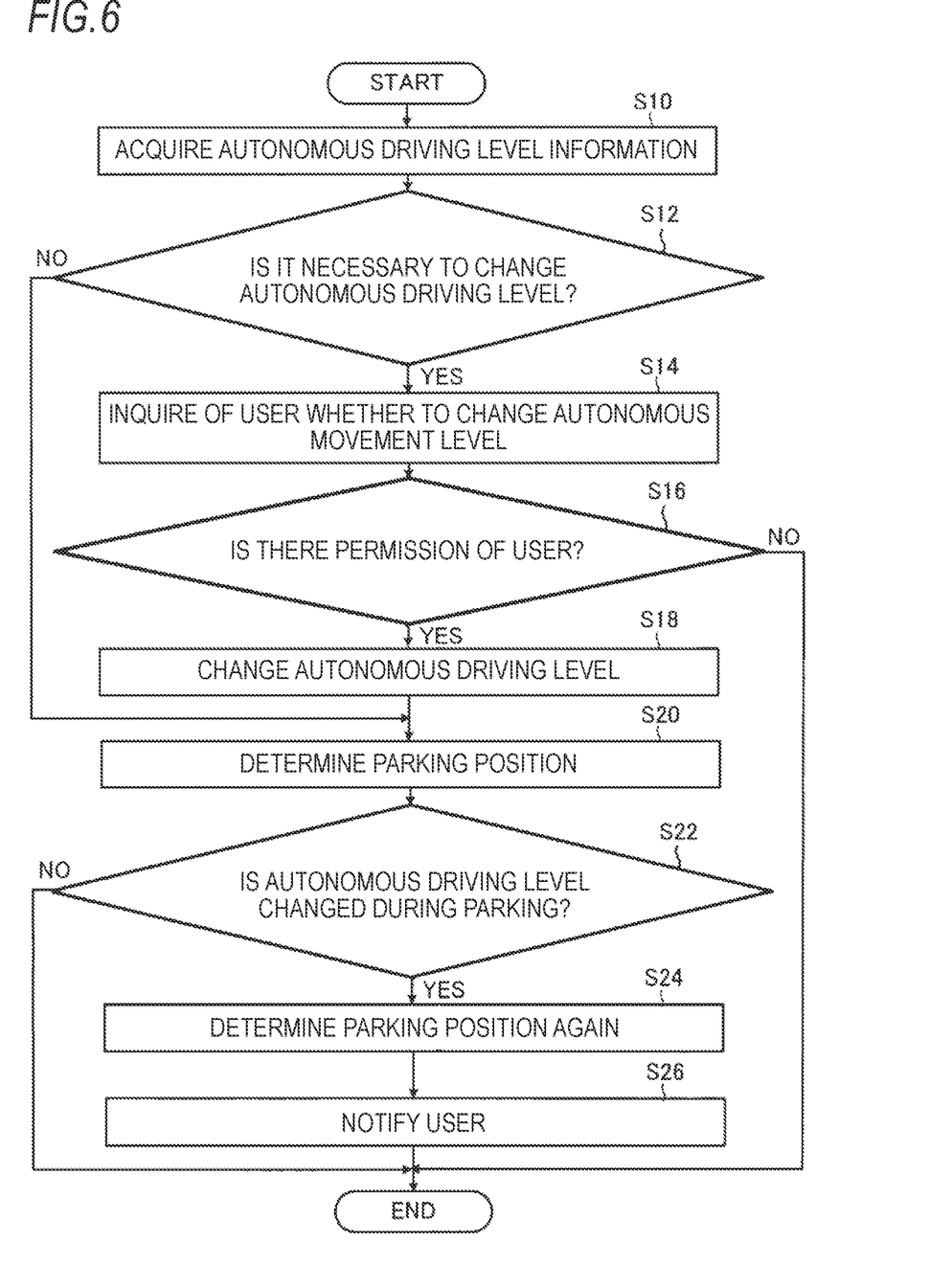
FIG. 6 is a flowchart illustrating a series of processing flows of the parking lot management device based on a first control example.

Hereinafter, a series of processing flows of the parking lot management device 400 based on the first control example will be described with reference to a flowchart. FIG. 6 is a flowchart illustrating a flow of a series of processes of the parking lot management device 400. The processing of this flowchart may be repeated at a predetermined cycle.

First, the acquisition unit 422 acquires the autonomous driving level information of the vehicle M to enter the parking lot PA via the communication unit 410 (Step S10). Next, it is determined whether it is necessary to change the autonomous driving level in order for the vehicle M to enter the parking lot PA (Step S12). When it is necessary to change the autonomous driving level (YES in Step S12), the processing unit 426 inquires of the terminal device 300 of a user of the vehicle M which intends to enter the parking lot PA via the communication unit 410 whether to change the autonomous driving level of the vehicle M (Step S14). When the permission notification is not obtained from the user's terminal device 300 in response to this inquiry (NO in Step S16), the parking lot management device 400 ends the processing of the flowchart illustrated in FIG. 6. On the other hand, in response to this inquiry, when a notification of permission is obtained from the user's terminal device 300 (YES in Step S16), the autonomous driving level of the vehicle M is changed (Step S18). It is desirable that this change should be set to a time-limited change. This period may be set to, for example, a period for the vehicle M to exit from the parking lot PA, or may be set to a predetermined period (for example, several hours).

Then, the processing unit 426 determines a parking position for parking the vehicle M based on the autonomous driving level of the vehicle M (Step S20) and parks the vehicle M at that parking position. Next, it is determined whether the autonomous driving level of the vehicle M has changed during parking (Step S22). When it is determined that the autonomous driving level of the vehicle M has not changed during parking (NO in Step S22), the parking lot management device 400 ends the processing of the flowchart illustrated in FIG. 6.

On the other hand, when it is determined that the autonomous driving level of the vehicle M has changed during parking (YES in Step S22), the processing unit 426 determines the parking position of the vehicle M again (Step S24). Then, the processing unit 426 notifies the user's terminal device 300 of the determined parking position via the communication unit 410 (Step S26) and ends the processing of the flowchart illustrated in FIG. 6.

In addition to the above-described processing flow, the processing unit 426 may change the distribution of the partial parking area based on the usage status of the parking lot PA, as described above.

Second Control Example

Next, a second control example of the parking lot management device 400 will be described. In the first control example, the parking position for parking the vehicle M is determined based on the autonomous driving level information acquired from the vehicle M when the vehicle M enters the parking lot PA. On the other hand, in the second control example, after the vehicle M is parked in the parking lot PA, the parking position is determined (changed) based on the autonomous driving level information acquired from the vehicle M. This makes it possible to perform re-parking, so-called reparking, in which the parking position of the parked vehicle M is changed to another parking position in the parking lot PA.

For example, suppose that a new vehicle with a low autonomous driving level (for example, classification C) enters the parking lot PA and tries to park in a situation in which the partial parking area corresponding to the lower autonomous driving level classification (for example, classification C) is full, but the partial parking area corresponding to the higher autonomous driving level classification (for example, classification B) has an empty space. In this state, the partial parking area corresponding to the low autonomous driving level classification is full and this new vehicle cannot be parked. However, when it is possible to raise (for example, from classification C to classification B) the classification of the autonomous driving level of the vehicle M of the classification C which is already parked and move (repark) the vehicle M to the partial parking area of the classification B by updating the software or the like, there will be an empty space in the partial parking area where the vehicle M was parked. As a result, it becomes possible to park a new vehicle M in the partial parking area in which an empty space is generated by the repark, and thus the parking lot PA can be effectively utilized.

When raising the autonomous driving level, as the target vehicle for software update, it is possible to preferentially select the vehicle which supports the software update, and for example, preferentially select the vehicle (rewriting speed is fast) which takes less time to update even with the same software.

Therefore, in such a situation, the processing unit 426 instructs the vehicle M to change the autonomous driving level when the vehicle M needs to move after entering the parking lot PA. As a result, w % ben the parking lot management device 400 needs to move the parked vehicle M in the parking lot PA, the parking lot management device 400 instructs the change of the autonomous driving level of the vehicle M. Therefore, it is possible to improve the convenience of the parking lot PA, improve the utilization efficiency of the entire parking lot PA, and effectively utilize the parking lot PA.

Further, as described in the first control example described above, there are at least two classifications of the vehicle M based on autonomous driving level information and vehicles M with the same classification may be parked together in a specific partial parking area in the parking lot PA. Under these conditions, when the vehicle M needs to be moved across two partial parking areas, each corresponding to a different classification, it is desirable that the processing unit 426 instructs the vehicle M to change the autonomous driving level. That is, since the parking lot management device 400 instructs the change of the autonomous driving level when it is necessary to move across two different classifications and does not instruct anything to the vehicle M which does not need to change the autonomous driving level, it is possible to suppress an increase in the operational load of the parking lot PA.

The change of the autonomous driving level may include, for example, a change of raising the autonomous driving level and a change of lowering the autonomous driving level. Here, it is desirable that the processing unit 426 gives priority to a change that lowers the autonomous driving level when it is necessary to move the vehicle M across different classifications.

It is easier to change to lower the autonomous driving level than to raise it. Therefore, the parking lot management device 400 can shorten the time from the instruction to the completion of the change of the autonomous driving level by giving priority to the easy change of lowering the autonomous driving level. As a result, the convenience of parking lot PA can be improved.

When there is no vehicle M capable of instructing a decrease in the autonomous driving level, the parking lot management device 400 may instruct a change to raise the autonomous driving level. The change to raise the autonomous driving level is, for example, software updates for the vehicle M and the change to lower the autonomous driving level is to stop a part of the function of the vehicle M. In such a case, the autonomous driving level can be easily changed, but the changes are not limited to such examples. Further, here, "software update" includes not only updating (rewriting) the actual software but also enabling (activating) the updated software when the updated software is not valid.

Processing Flow of Second Control Example

Figure 7:
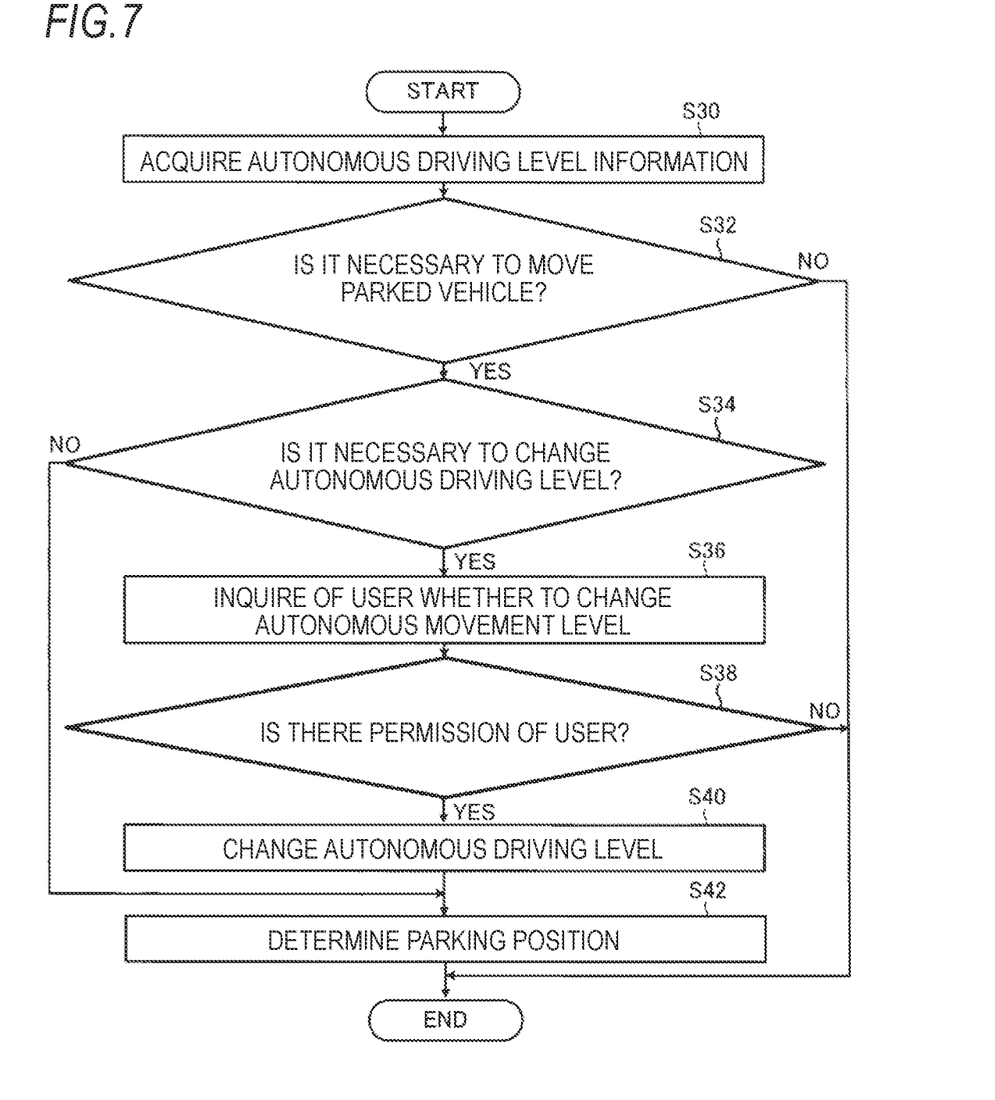
FIG. 7 is a flowchart illustrating a series of processing flows of the parking lot management device based on a second control example.

Hereinafter, a series of processing flows of the parking lot management device 400 based on the second control example will be described with reference to a flowchart. FIG. 7 is a flowchart illustrating a series of processing flows of the parking lot management device 400. The processing of this flowchart may be repeated at a predetermined cycle.

First, the acquisition unit 422 acquires the autonomous driving level information of the vehicle M parked in the parking lot PA via the communication unit 410 (Step S30). Next, the determination unit 424 determines whether the parked vehicle M needs to be moved (Step S32). When it is determined that the movement of the parked vehicle M is not necessary (NO in Step S32), the parking lot management device 400 ends the process of the flowchart illustrated in FIG. 7.

When it is determined that the parked vehicle M needs to be moved (YES in Step S32), the parking lot management device 400 determines whether it is necessary to change the autonomous driving level of the parked vehicle M (Step S34). When it is determined that it is not necessary to change the autonomous driving level of the parked vehicle M (NO in Step S34), the process proceeds to Step S42.

When it is necessary to change the autonomous driving level (YES in Step S34), the processing unit 426 inquires of the terminal device 300 of a user of the parked vehicle M via the communication unit 410 whether to change the autonomous driving level of the vehicle M (Step S36). When the permission notification is not obtained from the user's terminal device 300 in response to this inquiry (NO in Step S38), the parking lot management device 400 ends the processing of the flowchart illustrated in FIG. 7.

On the other hand, in response to this inquiry, when a permission notification is obtained from the users terminal device 300 (YES in Step S38), the autonomous driving level of the vehicle M is changed (Step S40). Then, the processing unit 426 determines a parking position for parking the vehicle M based on the autonomous driving level of the vehicle M (Step S42), parks the vehicle at the parking position, and ends the processing of the flowchart illustrated in FIG. 7.

The autonomous driving level described so far is a level based on the autonomous driving level of the vehicle M in the parking lot PA. By adopting the autonomous driving level in the parking lot PA, appropriate autonomous driving becomes possible in the parking lot PA.

In the embodiment described above, the parking position is set according to the so-called parking time of the vehicle. However, the idea of the invention is not limited to such an embodiment, and is also applied to a moving body (for example, a robot) including a vehicle. That is, the invention also includes a case where the target accommodation position is changed in the accommodation area for accommodating the so-called moving body. Under this idea, "parking" is extended to the concept of "stop". "driving" is extended to the concept of "movement", and the "parking lot management device" of the embodiment is extended to the concept of "accommodation area management device". In addition, since the "parking area" is an area which occupies a part of the parking lot, which is the accommodation area, it is extended to the concept of "partial accommodation area". The repark also includes an operation of "re-stopping to change the accommodation position of the stopped moving body to another accommodation position in the accommodation area" or "the stopped moving body moves to another accommodation position in the accommodation area and stops again".

Although the embodiments for carrying out the invention have been described above using the embodiments, the invention is not limited to those embodiments and various modifications and substitutions can be made without departing from the gist of the invention.

For example, in the embodiment described above, an example of changing the autonomous driving level of the vehicle M when it is necessary to move (that is, reparking is required) the parked vehicle M and it is necessary to change the autonomous driving level of the vehicle M is explained, but the invention is not limited to this. For example, in a parking lot with multiple platforms, it is conceivable that it is necessary to move the vehicle M to a platform where the vehicle M cannot reach without raising the autonomous driving level. That is, it is conceivable that there is an area between the parking position of the vehicle M and the platform, which is the destination, where the vehicle M cannot enter unless the autonomous driving level is raised. In such a case, the autonomous driving level of the vehicle M may be changed when moving (for example, when passing through the area where the vehicle cannot enter unless the autonomous traveling level is raised) to the platform to which the vehicle is to be moved.

In addition, at least the following matters are described in this specification. The components and the like corresponding to those of the embodiment described above are shown in parentheses, but the invention is not limited thereto.

(1) An accommodation area management device (parking lot management device 400) which manages an accommodation area (parking lot PA) for accommodating a moving body (vehicle M) and stops the moving body at a predetermined accommodation position (parking space PS) in the accommodation area, including:

an acquisition unit (acquisition unit 422) configured to acquire autonomous movement level information related to autonomous movement that the moving body can perform; and a processing unit (processing unit 426) configured to determine an accommodation position for stopping the moving body based on the autonomous movement level information when the moving body enters the accommodation area.

According to (1), the moving body can be stopped at the accommodation position in consideration of the autonomous movement level of the moving body. Therefore, compared to the case where the autonomous movement level of the moving body is not considered at all, the moving body can be stopped at an appropriate accommodation position, and thus the utilization efficiency of the entire accommodation area can be improved and the accommodation area can be effectively utilized.

(2) The accommodation area management device according to (1), where each moving body accommodated in the accommodation area is classified into one of two or more classifications prepared in advance based on an autonomous driving level of the moving body, and the processing unit is configured to determine the accommodation position of each of the moving bodies so that the moving bodies of the same classification are collectively accommodated in a specific partial accommodation area in the accommodation area.

According to (2), the accommodation position is determined so that the moving bodies which can be classified as having similar autonomous movement levels are grouped together. Therefore, it is possible to suppress the possibility that moving bodies having a large performance difference in the autonomous movement level are adjacent to each other, and to further improve the utilization efficiency of the entire accommodation area.

(3) The accommodation area management device according to (2), where the processing unit is configured to change the partial accommodating area based on a usage status of the accommodating area.

According to (3), since the distribution of the partial accommodation area can be changed based on the usage status of the accommodation area, the accommodation area can be effectively utilized.

(4) The accommodation area management device according to (2) or (3), where the processing unit is configured to determine an accommodation position included in a partial accommodation area accommodating less moving bodies of the partial accommodation area corresponding to the autonomous movement level before the change of the moving body and the partial accommodation area corresponding to the autonomous movement level after the change as an accommodation position for stopping the moving body when the autonomous movement level of the moving body changes after entering the accommodation area.

According to (4), the number of moving bodies stopped in respective partial accommodation areas can be averaged to effectively utilize the accommodation area.

(5) The accommodation area management device according to any one of (1) to (4), where the processing unit is configured to inquire a user of the moving body whether to change the autonomous movement level of the moving body when the number of moving bodies which can be accommodated in the accommodation area increases by changing the autonomous movement level of the moving body.

According to (5), it is possible to improve the utilization efficiency of the entire accommodation area and effectively utilize the accommodation area while respecting the intention of the user.

(6) The accommodation area management device according to (5), where the processing unit is configured to set a change of the autonomous movement level to a time-limited change when it is necessary to change the autonomous movement level of the moving body after the moving body enters the accommodation area.

According to (6), it is possible to increase the number of moving bodies which can be accommodated in the accommodation area while suppressing the cost required for changing the autonomous movement level.

(7) The accommodation area management device according to any one of (1) to (6), where the processing unit is configured to notify a user of the moving body that the autonomous movement level needs to be changed before the moving body enters the accommodation area when it is necessary to change the autonomous movement level of the moving body before the moving body enters the accommodation area.

According to (7), it is possible to improve the utilization efficiency of the entire accommodation area and effectively utilize the accommodation area while respecting the intention of the user.

(8) The accommodation area management device according any one of (1) to (7), where the autonomous movement level of the moving body is a level based on the level of autonomous movement of the moving body within the accommodation area.

According to (8), by adopting the autonomous movement level based on the level of autonomous movement within the accommodation area, appropriate autonomous movement within the accommodation area of the moving body becomes possible.

What is claimed is:

1. An accommodation area management device which manages an accommodation area for accommodating a moving body and is capable of stopping the moving body at an accommodation position in the accommodation area, comprising:

an acquisition unit configured to acquire autonomous movement level information related to autonomous movement that the moving body can perform; and
a processing unit configured to determine an accommodation position for stopping the moving body based on the autonomous movement level information when the moving body enters the accommodation area, wherein
the accommodation area is capable of accommodating a plurality of moving bodies,
each moving body of the plurality of moving bodies accommodated in the accommodation area is classified into one of two or more classifications prepared in advance based on an autonomous driving level of the moving body,
the processing unit is further configured to determine an accommodation position of each of the moving bodies so that the moving bodies of a same classification are collectively accommodated in a partial accommodation area that is associated with the same classification in the accommodation area,
the processing unit is further configured to, when the autonomous movement level information of the moving body changes after entering the accommodation area,
identify, between a partial accommodation area corresponding to the autonomous movement level information before the change and a partial accommodation area corresponding to the autonomous movement level information after the change, a partial accommodation area that accommodates fewest moving bodies, and
determine an accommodation position included in the identified partial accommodation area as an accommodation position for stopping the moving body, and the acquisition unit and the processing unit are each implemented via at least one processor.

2. The accommodation area management device according to claim 1, wherein
the processing unit is further configured to inquire a user of the moving body whether to change the autonomous movement level information of the moving body when a number of moving bodies which can be accommodated in the accommodation area increases by changing the autonomous movement level information of the moving body.

3. The accommodation area management device according to claim 2, wherein
the processing unit is further configured to set a change of the autonomous movement level information to a time-limited change when it is necessary to change the autonomous movement level information of the moving body after the moving body enters the accommodation area.

4. The accommodation area management device according to claim 1, wherein
the processing unit is further configured to notify a user of the moving body that the autonomous movement level information needs to be changed before the moving body enters the accommodation area when it is necessary to change the autonomous movement level information of the moving body before the moving body enters the accommodation area.

5. The accommodation area management device according to claim 1, wherein
the autonomous movement level information of the moving body is a level based on a level of autonomous movement of the moving body within the accommodation area.

\* \* \* \* \*